United States Patent [19]

Van Otteren

[11] 3,711,038

[45] Jan. 16, 1973

[54] PNEUMATIC TUBE SYSTEM

[75] Inventor: Wilbur M. Van Otteren, San Rafael, Calif.

[73] Assignee: Automatic Tube Co., San Rafael, Calif.

[22] Filed: Sept. 14, 1970

[21] Appl. No.: 71,793

[52] U.S. Cl. ..........................243/2, 243/19, 243/38
[51] Int. Cl. ..............................................B65g 51/04
[58] Field of Search............243/1, 2, 5, 7, 19, 38, 16

[56] References Cited

UNITED STATES PATENTS

| | | | |
|---|---|---|---|
| 3,237,881 | 3/1966 | Grosswiller et al. | 243/19 |
| 3,148,845 | 9/1964 | Buchwald et al. | 243/2 |
| 3,232,559 | 2/1966 | Grosswiller et al. | 243/2 |
| 3,265,324 | 8/1966 | Mach et al. | 243/19 X |
| 3,417,941 | 12/1968 | Stieber | 243/16 |

FOREIGN PATENTS OR APPLICATIONS 720,148  4/1942  Germany..........................243/5

Primary Examiner—Evon C. Blunk
Assistant Examiner—Merle F. Maffei
Attorney—Gregg, Hendricson & Caplan

[57] ABSTRACT

In a pneumatic tube transport system the direction of air pressure from a single blower is reversed to slow down a carrier at a terminal station. Controls automatically operate an air shifter to switch the blower connection from pressure to vacuum and then to a low positive pressure as the carrier approaches a terminal station and operates oppositely for reverse carrier travel. The invention is particularly adapted for large carrier systems and includes improved station structure for insuring carrier closure and locking.

5 Claims, 6 Drawing Figures

INVENTOR.
WILBUR M. VAN OTTEREN

BY
Gregg, Henderson & Caplan
ATTORNEYS

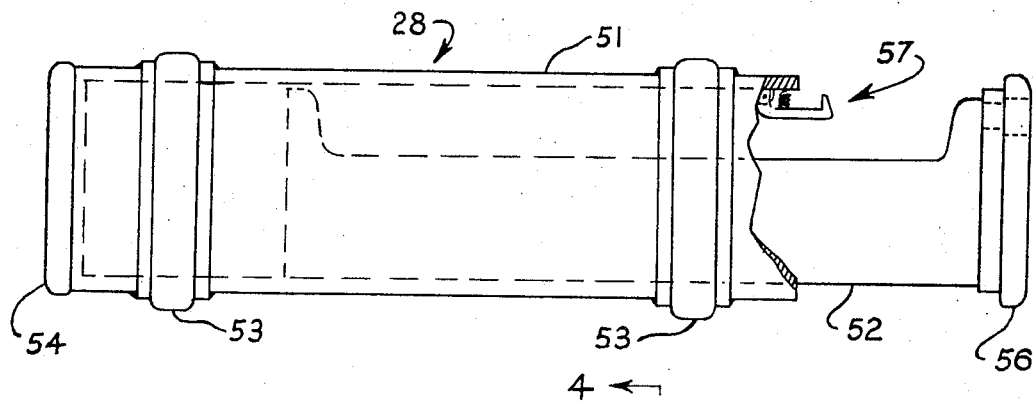
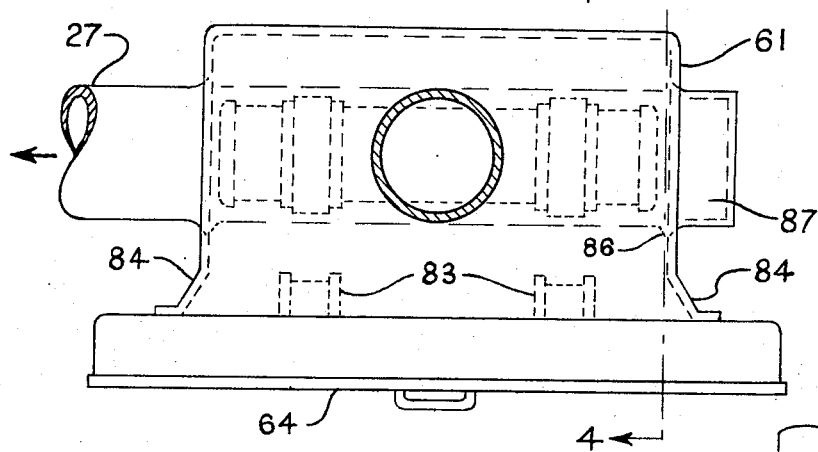
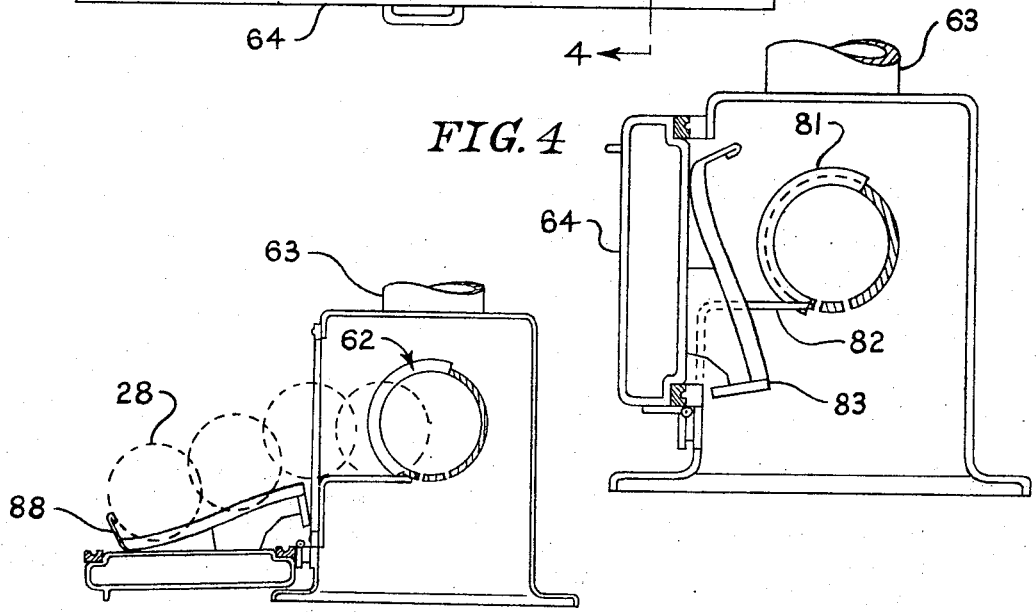
INVENTOR.
WILBUR M. VAN OTTEREN
BY
Gregg, Hendricson & Caplan
ATTORNEYS

3,711,038

PNEUMATIC TUBE SYSTEM

BACKGROUND OF INVENTION

The present invention generally relates to carrier transport systems in which the carrier is moved through a sealed tube between stations by the application of air pressure in the tube behind the carrier or the establishment of a vacuum in the tube ahead of the carrier. For some elongated tube systems there have been developed arrangements in which a carrier is moved some predetermined distance through the tube by following air pressure and then enters an airlock so that it may be further propelled along the tube by air pressure from a successive blower or the like. Many pneumatic tube systems, however, require only a limited travel as, for example, in a single building or the like.

In order to provide fast, efficient service with a pneumatic tube system it is required that the carrier be moved at a high speed through the tube or tubes of the system. This then poses the problem of stopping the tube at its terminal location or station. There have been developed a variety of different systems and devices to this end. The provision of a resilient bumper at a terminal station is unsatisfactory for many applications and along this line it is noted that U.S. Pat. No. 2,761,633 discloses a contracting device or system for slowing down a carrier in a pneumatic tube dispatch system. It has also been proposed that a carrier travelling through a tube system by the application of air pressure to the system behind the carrier may be slowed down by the application of high pressure air to a system ahead of the carrier. An example of this approach is to be found in U.S. Pat. No. 3,419,229 to Crosby. One of the disadvantages of any type of mechanical slowing or stopping means is the shock to the carrier and also the stress applied through the tube system to the station itself. With regard to the utilization of high pressure air at both ends of a system, it is noted that same requires either the provision of more than one blower or compressor or else requires the provision of a secondary piping system in addition to the tube carrier system.

Although there have been previously proposed various devices and systems which will most certainly stop a high velocity carrier in a tube system, they all suffer from various difficulties or limitations and certain of these are noted above. The present invention provides a pneumatic system of the type generally noted above in which but a single blower or compressor is required for propelling a carrier at high velocity through a pneumatic tube system and yet which automatically provides for slowing down and stopping the carrier at a terminal location or station without the application of undue stress or strain to the system or the carrier itself.

SUMMARY OF INVENTION

There is provided by the present invention an improved pneumatic system for transport of a carrier. A relatively conventional tube system may be employed in extension between a main station and one or more secondary stations connected by sealed tubes and having, for example, a diverter in the line or tube from the main station to direct the carrier from such main station to any desired secondary or terminal station. The system may also provide for propelling a carrier between any two stations of a system.

A single blower or compressor is provided with an air shifter connected thereto for directing either the high pressure outlet or vacuum inlet of the blower to a line leading to the main station of the system. In this line there is provided a first valve or vane operating to entirely open or to entirely close the line and also a second valve or vane which is normally open and which is controllable to move into a partially closed position for metering or limiting high pressure air or vacuum applied to the line. Signal generating means or switching means are provided adjacent and ahead of a terminal station to produce a signal upon passage of a carrier through the tube towards the station. This signal is employed to reverse the position of the air shifter so as to apply a vacuum to the line which then applied a reverse force to the carrier to slow it down and even stop it prior to the time it reaches the intended station. A predetermined and controllable time period after the air shifter is operated it is then returned to normal position and at the same time the metering or control valve is moved to a restricted flow position so that very low pressure air then slowly moves the carrier into the terminal station.

The carrier is returned from a secondary station to the main station in a reverse manner, i.e., by applying a vacuum to the line to draw the carrier toward the main station and a detecting or signal means in the line adjacent the main station signals approach of the carrier so that the shifter is operated to apply air pressure ahead of the carrier and slow it down with the sequence of operation then proceeding in the manner described above but with the metering valve then limiting the vacuum applied as the carrier is slowly moved into the main station.

There is furthermore provided by the present invention the capability of expanding pneumatic tube dispatch systems to larger sizes than have previously been employed. Eight inch tube systems and larger systems require carriers of substantial size and consequently substantial weight which then have a very substantial momentum when moved at high velocity through the tube or tubes of the system and the present invention provides for slowing down and stopping such large carriers without impact that would otherwise apply substantial stress or strain to the system or to the carrier and its contents.

A further problem that arises in systems of this type designed to accommodate large carriers is the possibility of a carrier opening during travel to the system. Conventional carriers comprise concentric cylinders fitting one within the other which are opened by sliding one of the cylinders out the end of the other one. Should such a carrier open during travel the combined length of the carrier then materially increases so that it probably cannot traverse bends or turns in the system tubing and subsequently would become jammed in a turn. This situation cannot be tolerated. The present invention overcomes the possibility of this type of difficulty, first by the provision of a particular station configuration wherein placing of a carrier within the system and the station automatically closes the carrier. The present invention furthermore provides for a positive locking of the carrier in closed position so that once it is inserted in the system it can only be opened by removal and manual manipulation of the locking means. Additionally, the above-noted particular station configuration serves not only to close the carrier but also to actuate the locking means thereof.

DESCRIPTION OF FIGURES

The present invention is illustrated as to a single preferred embodiment thereof in the accompanying drawings wherein:

FIG. 2 is an enlarged side elevational view of a partially opened carrier in accordance with the present invention and having a portion of one end broken away to illustrate locking means;

FIG. 3 is a top plan view of a pneumatic tube station with a carrier shown in phantom therein;

FIG. 4 is a transverse sectional view of a station in accordance with the present invention and taken in the plane 4—4 of FIG. 3 illustrating internal construction with the door closed;

FIG. 5 is a view similar to FIG. 4 but with the station door open and illustrating movement of a carrier from the station.

DESCRIPTION OF PREFERRED EMBODIMENT

Figure 1:
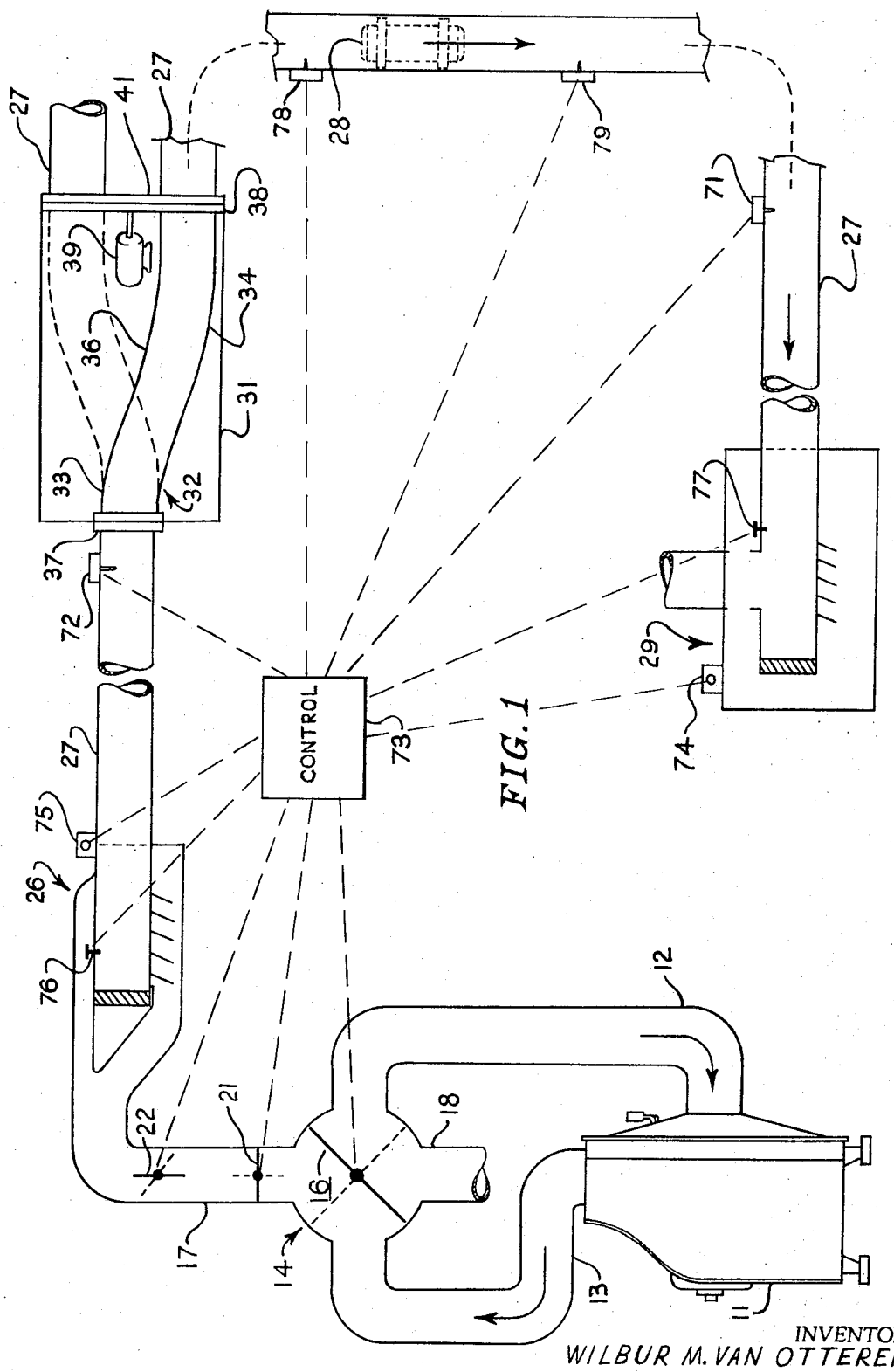
FIG. 1 is a schematic illustration of a pneumatic tube system in accordance with the present invention.

Referring first to FIG. 1, there is illustrated therein a compressor or blower 11 having an inlet pipe 12 and outlet pipe 13. The compressor is connected to an air shifter 14 which is only schematically illustrated inasmuch as air shifters for pneumatic tube systems are known in the art. In general the air shifter 14 comprises a housing having a movable vane 16 therein extending diametrically across the housing internally thereof. The compressor inlet and outlet pipes 12 and 13 are connected to opposite sides of the housing. A feed pipe 17 is connected to the housing between the compressor inlet and outlet pipes and a fourth exhaust pipe 18 of the shifter extends therefrom diametrically opposite to the feed pipe 17. It will thus be appreciated that the shifter housing is divided into what may be termed 90° quadrants with a pipe communicating with the interior of the shifter housing in each quadrant. The movable vane 16 of the shifter is rotatable 180° at a time, preferably by snap action, and thus will be seen in one position to connect the feed line 17 to the compressor outlet 13 while connecting the compressor inlet 12 to the atmosphere through shifter pipe 18 and in the other position to connect the feed line 17 to the compressor inlet line 12 while connecting the compressor outlet 13 to the atmosphere.

In the feed line 17 there is provided a first valve or vane 21 adapted to rapidly move between a position closing the line to a 90° rotated position providing substantially no obstruction in the line. There is also provided in the feed line what may be termed a second or metering valve or vane 22 movable between a position providing substantially no obstruction in the line to an adjustable position obstructing the line to a predetermined extent but not closing the line. This metering valve 22 is provided for the purpose of metering or limiting the opening thereat through the line for limiting the amount of pressure or vacuum applied from the air shifter through the line 17. Both of the valves 21 and 22 may, for example, be solenoid operated.

The tube system as illustrated in FIG. 1 includes a first or main station 26 having a tube 27 extending therefrom and through which there is adapted to be transmitted a carrier 28. It will be appreciated that any particular tube system may have numerous stations but in FIG. 1 there is illustrated only one terminal station 29 with a diverter 31 connected in the tube line 27 to make tube connection between stations 26 and 29. Briefly with regard to the diverter 31 it is noted that same may include a tube 32 having first and second parallel tube sections 33 and 34 laterally offset with respect to each other and connected by an inclined tube portion 36. A rotary coupling 37 connects the first portion 33 of the diverter tube 32 to the tube 27 extending from the first station 26. The other end 36 of the tube 32 is carried in a rotary mounted plate 38 which is controllably rotated as by an electric motor 39. A stationary plate 41 has a number of different tubes 27 of different portions of the system extending therethrough and therefrom about a circle having a radius equal to the radius of offset of the diverter tube 32. Thus at command the motor 39 is energized to rotate the plate 38 and consequently to swing the diverter tube 32 into registry with a selected output tube 27 of the system. It is noted that diverters are known in the art and the one described and illustrated is only exemplary of control means for directing the carrier 28 in the system to a desired terminal station.

The tube 27 extends from the diverter to the terminal station 29, for example, such that with the diverter 31 so adjusted the carrier may be transferred through the tube from a station 26 to the station 29. The first station or main station 26 will be seen to be connected to the feed line 17 from the compressor such that air pressure vacuum may be applied to the station for moving a carrier therefrom or drawing it therein from another station. This connection of the feed line may extend to the top and bottom of the station as indicated for reasons discussed in more detail below.

Considering now a carrier in accordance with the present invention and referring to FIG. 2, there will be seen to be illustrated therein a carrier 28 formed as an outer cylinder 51 having one closed end and one open end. Within the outer cylinder 51 there is slidably disposed an inner cylinder 52 adapted to hold materials to be transported by the carrier in the pneumatic tube system. The top portion of the inner cylinder is cut away so as to provide for access through the interior thereof. Two or more rings 53 of felt or the like are secured about the outer cylinder 51 in spaced relation to each other to provide smooth surfaces engaging the interior of the tube 27 of the system. A resilient end 54 may be provided in the outer cylinder and a resilient end 56 on the exterior end of the inner cylinder. Provision is made for locking the inner cylinder within the outer cylinder, as for example, by latch means 57 so as to maintain the container closed during travel through the tube.

It is particularly noted that the carrier must in fact remain closed during traverse through the system for otherwise the length of the carrier would increase, quite possibly to such an extent that the carrier could not traverse curves in the system. This would then result in the carrier becoming jammed in a curve and rendering the system inoperable until it was removed. This point is particularly important with regard to large carriers and large tubes wherein curves of very substantial radius are required merely for the carrier to be able to go around the curves. Because of the necessary large radii of curvature it is normally not feasible to further increase such radius as a safety measure, and thus it is particularly important to ensure that the carrier remains closed during travel. It is to be realized that a variety of different latching means are possible and the one illustrated is only exemplary. It is furthermore noted that more than one latching means be provided to further guarantee locking of the container.

With regard to the stations of the present invention, reference is made to FIGS. 3 to 5 illustrating a terminal station to which containers are transported by the system. Station 29 will be seen to comprise an air-tight box 61 through which tube 27 extends. The length of the housing or tube within the housing is substantially the length of a carrier 28. The tube within the housing is cut away as shown at 62 so that the carrier may be removed laterally from the tube. A tube 63 extends through the top of the housing to provide communication between the interior thereof and the atmosphere. A door 64 is provided on the front of the housing for opening in order to remove the carrier from the housing. Further details of the housing are described below.

With regard to the system of the present invention it is furthermore noted, as shown in FIG. 1, that a first switch 71 is provided in the tube 27 of the system ahead of the terminal station 29. The unit 71 is provided as a signal generator to identify the passage of the carrier 28 through the tube 27 toward the station 29. In practice the unit 71 may be provided as a photocell, for example, with a small light source for interruption of light to the photocell by passage of the carrier through the tube or alternatively a variety of different types of mechanical switches may be employed. A similar unit or signal generator 72 is provided in the tube adjacent the main terminal or station 26. The switches 71 and 72 are arranged to operate only upon passage of the carrier toward the adjacent station.

There is provided a control unit 73 connected to the signal generators 71 and 72 and adapted to receive signals therefrom for controlling operation of the system. In operating the system illustrated in FIG. 1, a carrier 28 disposed in the station 26 is propelled to the station 29 by adjusting the air-shifter to the position illustrated wherein the compressor outlet line 13 is connected through the feed line 17 to the station 26 and the compressor inlet line 12 is connected to the atmosphere. The first valve 21 is then opened so that pressure is applied through the line 17 to the station 26 to thereby force the carrier from the station so that it then travels through the tube 27 propelled by air pressure behind it. With the diverter arranged as indicated the carrier will then traverse the system till it approaches the station 29 and passes the signal generator 71. It is noted that for efficient operation the carrier will be forced to travel at a relatively high velocity say, for example, 30 feet per second. The present invention then provides for a signal from the generator 71 to be applied to the control unit 73 which then operates to reverse the position of the air shifter 14 by swinging the vane thereof 180° to the dotted position shown in FIG. 1. This then connects the inlet line 12 of the compressor to the feed line 17 and consequently draws a vacuum on the entire system immediately. This vacuum then applies force in the opposite direction to the carrier so that it immediately slows down and preferably stops. Prior to the time that the carrier reaches the station 29 the control unit 73 simultaneously reverses the position of the shifter back to the position shown in full lines and turns the control or measuring valve 22 to the dotted position wherein it throttles or meters air passing through the line 17. This then applies as a low positive air pressure behind the carriers so that it slowly moves into the station 29 where it comes to rest.

The control unit 73 incorporates adjustable time delay means so that the timing of the above-noted events following generation of a signal unit 71 is adjustable to properly move the carrier slowly into the station 29. It is to be appreciated that for different installations the distance between the signal generator 71 and the station 29 may well vary. Consequently the timing of the application of vacuum to the line for slowing down the carrier and in fact preferably stopping it and for then subsequently applying a limited or low volume of air behind the carrier to move it smoothly into the station is set by the time delay means to compensate for these different distances that the carrier may travel between the generator and the station.

For reverse travel of the carrier from the terminal station 29 to the main station 26 a similar but opposite operation is performed. A vacuum is applied from the compressor through the air shifter to the feed line 17 so that the carrier is drawn by vacuum from the station 29 through the tube 27. As the carrier passes the signal generator 72 a signal is applied to the control unit 73 which then reverses the air shifter positions so as to apply high pressure air through the station 26 and line 27 in front of the on-coming carrier. This then slows down and preferably stops the carrier before it reaches the station. The air shifter is then reversed and the switch 22 is moved to throttle or metering position so that vacuum with a greatly reduced volume is applied to the tube 27 ahead of the carrier and the carrier is thus slowly drawn into the station to come to a gentle stop therein.

Various other relatively conventional controls are provided in the system as, for example, the switches 74 and 75 located at each station for initiating operation as described above to eject the carrier therefrom. There is furthermore provided in accordance with the present invention a switch in each of the stations as indicated at 76 and 77 for indicating the presence of a carrier in the station. This is particularly important in the present invention as it would be highly undesirable to initiate operation of the sequence described above without a carrier being present in the station to thus by its traverse through the tube complete the cycle of operation. No attempt is made in FIG. 1 to fully illustrate the connections of switches and the like other than by some general indications of dashed lines to the control unit 73. However, there is described below one possible configuration of the control unit 73 and including connections between switches and the like of the present invention.

Although the present invention has been described above in connection with controlling the velocity of a carrier approaching a station it is noted that this control is also applicable to controlling the velocity of a carrier in a vertical tube. Some systems include long vertical drops in which a carrier may exceed desired speed. By employing sensing and timing means in a vertical line the carrier velocity may be determined or at least compared to a predetermined limit and vacuum applied to slow down the carrier as required. A pair of sensors or signal generators 78 and 79 may be provided in a vertical tube section with a predetermined separation between the sensors. A carrier descending in the tube then produces two time spaced signals and the spacing may be compared to a preset time period or delay to cause the air shifter to reverse to vacuum application to the line for a limited time if the time spacing between sensor signals is too short.

Referring now further to the improved pneumatic tube dispatch station of the present invention there will be seen to be illustrated in FIGS. 4 and 5 end views of the station shown in plan in FIG. 3 and briefly described above. Within the housing the tube 27 is cut away as illustrated at 62 so that the carrier 28 may be moved into and out of the tube laterally thereof. A plate 82 extends from the lower portion of the tube substantially to the door 64 so that the tube can be rolled on the plate from the tube as it is being removed therefrom. The door 64 carries a pair of tracks 83 secured to the inside of the door which in turn is pivotally mounted to move between generally vertical and horizontal positions. Appropriate seals are provided above the door and opening into the front of the housing. The tracks 83 are inclined with respect to the door so as to extend downwardly from the plate 82 when the doors open. This position is illustrated in FIG. 5 of the drawings wherein there is shown in dotted lines successive positions of a carrier rolled from the tube in the station out onto the horizontally disposed door for ready access to the carrier. The tracks are aligned with the rings 53 on a carrier disposed in a station and thus the carrier may be moved along the tracks by rolling it with the rings fitting in the tracks.

There is also provided as a portion of the terminal station illustrated in FIGS. 3 to 5 means for insuring that the carrier is completely closed when it is deposited or placed in the tube of the station. In normal use the carrier would be opened at the station to remove or exchange the contents and then returned to the station for travel back to the main station. The housing 61 has the side walls adjacent the door inclined inwardly of the housing, as best seen in FIG. 3. These inclined wall portions 84 are provided to engage the ends of a container rolled up the tracks and onto the plate 82 if the container is not entirely closed. The flaring nature of these side walls 84 will then serve to push the container closed as the interior length of the station housing is substantially the same as the length of a closed container. There is also provided slightly flared or belled rims about the cut-out portion of the tube at both ends of the cut-out, as indicated at 86 for further pressing together the ends of the container rolled or slid into the tube. There may also be provided a cushion 87 in the end of the tube 27 at the station to provide a bumper.

It will thus be seen that the station illustrated in FIGS. 3 to 5 is particularly advantageous for handling of large carriers. Provision is made for rolling the carrier from a station on to the open door of the station so that access to the interior of the carrier may be readily accomplished. Even though the carrier may be formed of plastic, for example, a carrier having a diameter of the order of 8 inches and a length of 2 feet may weigh 10 pounds. A filled carrier then may be somewhat unwieldy for a person to lift and is at least awkward to handle. The station of the present invention obviates the necessity of lifting the carrier, for the carrier may be opened while resting on the door against an upward projection 88 at the outer end of the tracks 83. To return the carrier to the tube for transport from this station it is only necessary to reclose the carrier and then to roll it up the tracks across the plate and into the tube. Should the operator fail to tightly close the carrier so that it is not latched or locked together, the very act of rolling the carrier into the tube will cause the carrier to be fully closed by engagement with the tapered side walls 84 of the station and the outwardly belled edges of the cutaway portion of the tube in the station.

Figure 6:
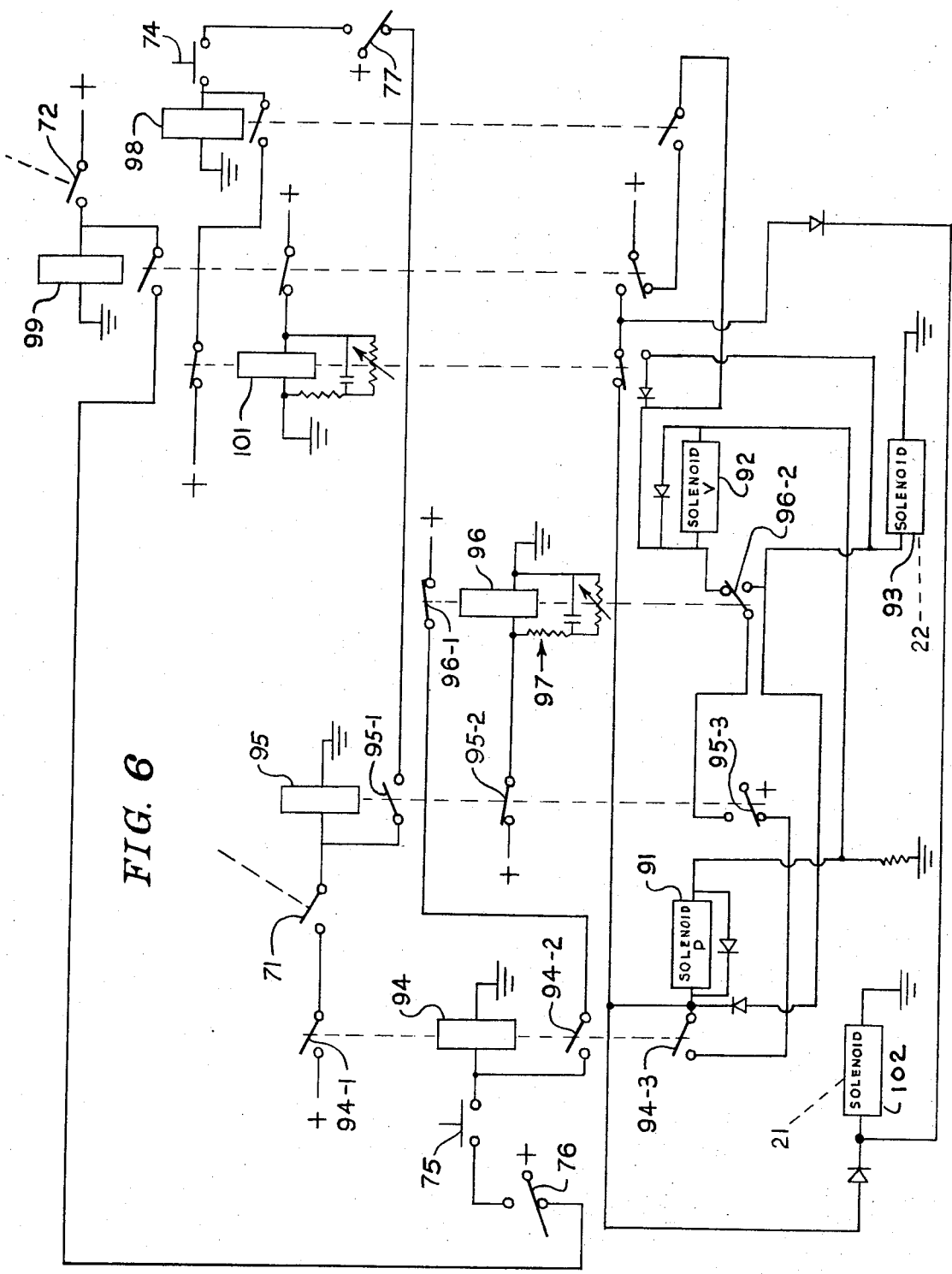
FIG. 6 is a schematic wiring diagram of a control unit of the present invention.

Considering now the control of the present invention and referring to FIG. 6 of the drawings, it will be seen to be illustrated one possible control circuit. In the circuit of FIG. 6 there are included two solenoids 91 and 92 which are employed to operate the air shifter 14. Solenoid 91 turns the vane 16 of the air shifter into the position illustrated in FIG. 1 wherein pressure is applied from the compressor to the tube system. Solenoid 92 is provided for flipping the vane or rotating it to the dotted position in FIG. 1 for applying a vacuum to the tube system. A third solenoid 93 illustrated in the center of FIG. 6 is provided for the purpose of operating the metering or throttle valve 22. It is contemplated that this valve 22 will normally remain open as indicated by the solid line position thereof in FIG. 1 and upon actuation of the solenoid the valve will be partially closed as indicated by the dashed lines in FIG. 1 and held in such position only so long as the solenoid 93 is energized. Switches in the system bear the same number in the circuit diagram of FIG. 6 as in FIG. 1. For convenience of nomenclature the main station 26 will be referred to as the first station in describing the circuit of FIG. 6. Switch 76 in the first station is a two-position switch as illustrated and with a carrier present in the stations the switch 76 is moved from its normal illustrated position to connect the positive power supply terminal through the push button switch 75 to one side of a relay 94 having the other side thereof electrically grounded. Thus closure of switch 75 with the carrier in the first station energizes the relay 94 to close the contacts 94-1, 94-2 and 94-3 thereof. Relay 94 thus locks itself in operated condition through its contact 94-2. Closure of relay contact 94-3 completes a circuit energizing pressure solenoid 91 and also energized a solenoid 102 for opening the main on-off valve 21. A relay 95 includes a normally open contact 95-1, a normally closed contact 95-2 and a two-way contact 95-3. Relay 95 is normally de-energized and thus the contact 95-3 connects a positive power supply terminal through a relay contact 94-3 to the solenoid 91 that has the other side thereof grounded. This then results in pressure being applied to the tube system to forcibly eject the carrier from the first station and force the carrier to travel through the tube 27 of the system.

As the carrier approaches the second station it will pass the detector or signal generator 71 which is illustrated in FIG. 6 as comprising a switch connected in series with relay contact 94-1 between a positive power supply terminal on one side of the relay 95 which has the other side thereof grounded. Consequently relay 95 will be energized as the carrier passes the switch 71 and this then causes relay contact 95-1 to close and thus to maintain relay 95 in operating condition by connection through switch 77 to a positive power supply. A third relay 96 is normally energized through the relay contact 95-2 and opening of this relay contact 95-2 thus removes energization from the relay. An RC time delay circuit 97 connected across the relay maintains this relay 96 operative for some adjustable time following opening of the relay contact 95-2. Actuation of relay 95 also switches contact 95-3 to disconnect the positive power supply terminal from the solenoid 91 and to connect this positive power supply terminal through relay contact 96-2 to the vacuum solenoid 92. Consequently the air shifter is operated by energization of the vacuum solenoid 92 to apply a vacuum to the tube system for slowing down the carrier prior to its entry into the second station.

As is noted above, relay 96 remains energized for an adjustable time period following disconnection of same from the positive power supply terminal as results from actuation of the switch 71. This then retains relay contact 96.2 in position to apply the positive potentials of the vacuum solenoid 92 only for this adjustable time period. At the expiration of this time, relay 96 is deenergized and contact 96.2 then shifts position to apply positive power supply voltage from contact 95-3 back to the pressure solenoid 91 for actuating such solenoid and reversing the air shifter to apply pressure to the tube system. Positive voltage is also applied from contact 95-3 through contact 96-2 to the metering valve solenoid 93. This actuates valve 22 to throttle or meter airflow through the system so that only a relatively low volume of high pressure air is applied to the carrier to slowly move it into the second station. It will be noted that as relay 96 becomes deenergized, normally closed contact 96-1 thereof opens to thus deenergize relay 94 so that the contact thereof returns to the position illustrated in the drawing. Solenoid 102 is then deenergized to close valve 21.

As the carrier enters the second station the switch 77 is moved from the position illustrated in FIG. 6 to thus deenergize relay 95 which thereupon closes contact 95-2 for reenergizing relay 96 and returning the contacts thereof to the positions shown. At this time, with the container located in the second station, relays 94 and 95 are deenergized and relay 96 is energized just as was the original situation prior to travel of the carrier through the system.

The control circuit of FIG. 6 includes additional relays 98, 99 and 101 which are comparable to the relays 94, 95 and 96 respectively but which are employed to control movement of the carrier from the second station back to the first. It will be noted that there is one difference in the connection of these relays and that is the initial energization of the vacuum solenoid 92 to control the air shifter 14 for first applying a vacuum to the system inasmuch as the carrier is moving in the opposite direction through the system. The carrier slowed down before reaching the first station by reversing the shifter to thus apply air pressure to the line in opposition to the movement of the carrier, and then the carrier slowly moves into the station under the influence of a reduced volume of vacuum.

It will be noted that the circuit of FIG. 6 is illustrated to operate the two stations illustrated in FIG. 1. It will of course be appreciated that the system is also applicable by multiplication to control any further number of stations desired or automated to control carrier travel from any station to any other station in the system.

There has been described above a preferred embodiment of the present invention, however it is not intended to limit the invention to the precise details of the description or illustration. It will be apparent to those skilled in the art that various modifications and variations are possible within the scope of the invention.

What is claimed is:

1. In a pneumatic tube system having a sealed tube extending between a first station and at least one terminal station, an air compressor having an inlet and outlet and shifter means selectively connecting inlet or outlet of said compressor to said first station, and a carrier adapted to fit said tube for movement by air pressure or vacuum between said stations, the improvement comprising a metering valve connecting said shifter and first station and movable between a normal open position to an operated partially closed position for metering the flow of air between said first station and shifter, signalling means communicating with said tube and spaced from each terminal station toward said first station and signalling passage of a carrier through the tube toward the terminal station, and control means actuated by said signalling means and reversing said shifter means to reverse the flow of air for an adjustable time period to slow down the carrier and then returning the shifter means to original position and moving said metering valve to operated partially closed position to slowly move the carrier into the terminal station.

2. The improved system of claim 1 further defined by a start switch at each station and switching means in each station operated by the presence of a carrier therein, said start switch and switching means being serially connected whereby air pressure or vacuum to move the carrier from the station can only be applied by operation of both the start switch and switching means.

3. The improvement of claim 2 further defined by said shifter means including a vane movable between a first position connecting the compressor outlet to said first station and the compressor inlet to atmosphere and a second position connecting the compressor inlet to said first station and the compressor outlet to atmosphere, solenoid means for moving the air shifter vane between said first and second positions, relay means connected for operation by said combination of start switch and switching means and having contacts connected to control energization of said solenoid means.

4. A method of moving a carrier from a first station to a second station through a sealed tube extending between the stations and in which the carrier slidably fits, comprising the steps of a. applying a substantial positive air pressure to the tube behind the carrier at the first station to urge the carrier through the tube toward the second station,
b. sensing passage of the carrier through the tube toward the second station at a short predetermined distance from the second station,
c. automatically terminating application of air pressure in response to sensing of passage of said carrier and in further response to passage of said carrier toward said second station applying a vacuum to the tube at the first station for a predetermined period of time, and
d. terminating the application of vacuum to the tube a predetermined time after application thereof in step (c) so that the carrier moves slowly into the second station.

5. The method of claim 4 further defined by maintaining application of the vacuum to the tube until the carrier substantially stops in the tube and then, after terminating the vacuum, applying to the tube at the first station a low positive air pressure to slowly move the carrier into the second station.

* * * * *